United States Patent [19]

Bott et al.

[11] 4,145,916

[45] Mar. 27, 1979

[54] CAP INSPECTION APPARATUS

[76] Inventors: Gerald J. Bott, 1941 Westwood Dr., NE., Grand Rapids, Mich. 49505; William C. Porter, 7530 28th Ave., Hudsonville, Mich. 49426; Terrance M. Nowak, 1510 Pine, NW., Grand Rapids, Mich. 49504

[21] Appl. No.: 823,027

[22] Filed: Aug. 9, 1977

[51] Int. Cl.$^2$ .............. G01M 3/32

[52] U.S. Cl. .............. 73/49.3; 73/37

[58] Field of Search .............. 73/37, 40, 49.2, 49.3

[56] References Cited

U.S. PATENT DOCUMENTS

| | | | |
|---|---|---|---|
| 2,268,124 | 12/1941 | Maybarduk | 73/45.2 |
| 2,383,936 | 9/1945 | Hohl | 73/49.3 |
| 2,399,391 | 4/1946 | Russell | 73/45.4 |
| 3,224,252 | 12/1965 | Hamilton | 73/49.2 |
| 3,314,283 | 4/1967 | Fitzpatrick et al. | 73/40 |
| 3,374,887 | 3/1968 | Paruolo et al. | 73/37 X |
| 3,496,761 | 2/1970 | Powers, Jr. | 73/45.2 |
| 3,499,314 | 3/1970 | Roberts et al. | 73/45.2 |
| 3,527,084 | 9/1970 | Laub | 73/45.2 |
| 3,595,065 | 7/1971 | Scribner | 73/37 |
| 3,683,676 | 8/1972 | Hass | 73/45.1 |
| 3,751,972 | 8/1973 | Haas | 73/45.4 |
| 3,834,429 | 9/1974 | Schulz | 73/45 X |
| 3,847,014 | 11/1974 | Mistarz | 73/49.3 |
| 3,859,844 | 1/1975 | Hruby | 73/45.4 |
| 3,874,226 | 4/1975 | Weber | 73/45.2 |
| 4,061,014 | 12/1977 | Bott et al. | 73/45.1 |

FOREIGN PATENT DOCUMENTS

| | | | |
|---|---|---|---|
| 665391 | 6/1963 | Canada | 73/49.2 |
| 2656118 | 7/1977 | Fed. Rep. of Germany | 73/49.2 |

*Primary Examiner*—Richard C. Queisser
*Assistant Examiner*—Joseph W. Roskos
*Attorney, Agent, or Firm*—McGarry & Waters

[57] ABSTRACT

A cap inspection apparatus has an inspection stand and sorter for sorting defectively capped bottles from properly capped bottles. The inspection stand has a nozzle with a rearward flat bottom surface and a front inclined bottom surface inclined upwardly from the rear bottom surface. An air passage extends through the rear bottom surface. A low pressure air stream is operably connected to the air passage and passes through the nozzle. A pressure sensitive switch means is operably connected to the low pressure air stream. A solenoid valve is operably attached to the pressure sensitive switch means and controls a high pressure air stream operably connected to an air operated cylinder and rod. An ejection block is mounted at the end of the extendible rod for pushing defectively capped bottles.

11 Claims, 6 Drawing Figures

CAP INSPECTION APPARATUS

BACKGROUND OF THE INVENTION

1. Field of the Invention

This invention relates generally to a cap inspection apparatus and more particularly to a cap inspection apparatus which detects defectively capped bottles.

2. Description of the Prior Art

With the advent of machinery capable to fill and cap bottles, a need for an inspection system for detecting defective bottles simultaneously arose.

Machines were also developed to automatically cap filled bottles. Inspection systems for detecting defective caps were developed.

One inspection system for detecting defective caps is disclosed in U.S. Pat. No. 3,499,314, issued to Roberts et al on Mar. 10, 1970. Roberts et al discloses an apparatus for testing covers when covers are placed into a cell. The cell has an upper half and lower half. A high pressured gas stream passes into the lower half of the cell. If the cap is defective, gas will seep into the upper half of the cell and be detected by a transducer in communication with the upper half.

Often, however, the cap itself may not be defective but may merely be defectively placed on the bottle when it is not properly capped with the cap. It is, therefore, desirable to an inspection system which inspects caps after they are capped onto a bottle.

U.S. Pat. No. 3,847,014, issued to Mistarz on Nov. 12, 1974, discloses an enclosure leak tester for detecting leaky caps. A piston is extended downwardly to deform a cap. A bore passing through the piston is connected to a backing pump. The open end of the bore abuts the top of the cap. As the piston pushes down on the cap, rollers flex the upper side walls of the container. The piston then extends a bit upwardly. If the cap is conforming, a resilient cap will follow the piston upwardly and maintain the vacuum within the bore. If the cap is a leaker, the cap will disengage the bore. The device is limited to testing only resilient caps that are capped on deformable containers.

SUMMARY OF THE INVENTION

According to the invention, there is provided a method for inspecting capped bottles and determining if the bottle is properly or improperly capped. A properly capped bottle has its cap engage the neck of the bottle to provide for a leakless seal. The method comprises injecting gas at a predetermined rate into an air passage adjacent the cap, measuring the rate of pressure buildup in the passage, and sorting the capped bottles according to whether the rate of pressure buildup is as great as or falls below a predetermined value.

Further according to the invention, an inspection apparatus for inspecting capped bottles includes a nozzle shaped to seal against a properly positioned cap on a capped bottle. The nozzle has a passage therethrough.

In one embodiment, the cap has a flat top and cylindrical portion which engages a corresponding cylindrical portion of a bottle neck. The nozzle is pivotably mounted about a horizontal axis. A front bottom surface of the nozzle is inclined downwardly from the front toward the rear of the nozzle. A rear bottom surface is flat. An air passage extends through the rear portion of the nozzle end as an opening at the rear bottom flat surface. The nozzle is positioned such that a properly capped bottle, when inspected, abuts the inclined surface, pivots the nozzle slightly upwardly, and slides under the rear bottom flat surface. The cap closes the opening of the air passage.

Further, according to the invention, means are provided for measuring the rate at which pressure builds up within the air passage when the nozzle is in sealing engagement with the bottle cap. Means are coupled to the measuring means for indicating whether the rate at which pressure builds up in the bottle is above or below a predetermined rate.

Desirably, the rate measuring means includes means to detect the presence of a second predetermined pressure in the gas supply means conduit, the second predetermined pressure being above the first pressure of the gas supply means.

In a preferred embodiment of the invention, a conveyor continuously moves the capped bottles past the nozzle, such that the nozzle is in sealing engagement with a properly mounted bottle cap for a predetermined length of time.

Further, according to the invention, means are provided for sorting the bottles according to whether the rate at which the pressure builds up in the air pressure is as great as or below a predetermined rate. The sorting means comprises an ejector which is operated responsive to detection of the buildup of the second predetermined pressure in the gas supply line during the pressurizing cycle. Means for deactuating the ejector responsive to the detection of the second predetermined pressure are included. Delay means are provided for operation of the ejector to permit the tested cap bottles to move from the nozzle to the ejector. Thus, those bottles which have defects are rejected from the conveyor by the ejector. Those bottles which are free from defective caps continue on the conveyor.

Further according to the invention, means are provided for halting the operation of a bottle filler if the number of consecutively defectively capped bottles exceeds a predetermined number.

In this fashion, an air inspection apparatus allows for the inspection of capped bottles wherein the absence of a cap or the improper position of a cap can be detected on a bottle and the bottle is subsequently sorted.

BRIEF DESCRIPTION OF THE DRAWINGS

The invention will not be described to the accompanying drawings in which.

DETAILED DESCRIPTION OF THE PREFERRED EMBODIMENT

Figure 1:
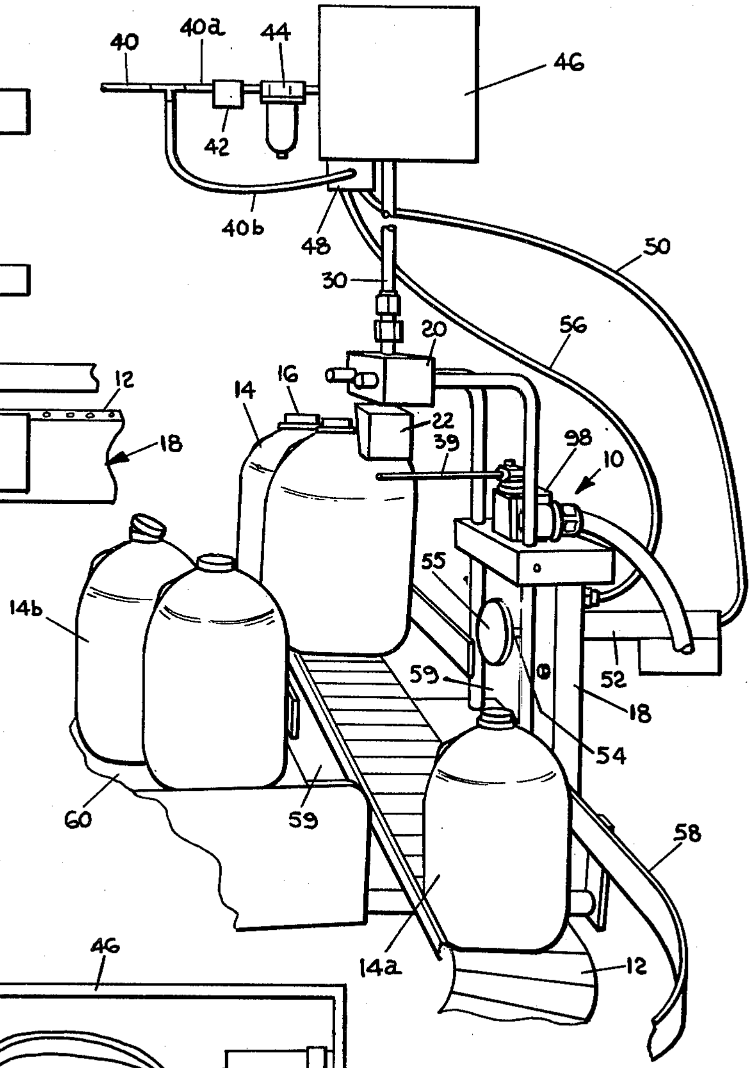
FIG. 1 is a perspective view of a capped bottle inspection according to the invention adjacent a conveyor for the bottles.

Referring particularly to FIG. 1, a capped bottle inspection apparatus 10 is mounted adjacent a conveyor 12 which conveys filled and capped bottles 14. Caps of any material 16 either are threaded or snapped onto the bottle 14. The bottle inspection apparatus 10 includes an inspection stand 18. A spring biased rod 39 is pivotably mounted on stand 18 for movement between a first and second position. The rod 39 is operably connected to limit switch 98. The inspection stand 18 has an upper portion 20 which extends vertically over the conveyor 12. Mounted on the upper portion 20 is a nozzle 22.

Figure 2:
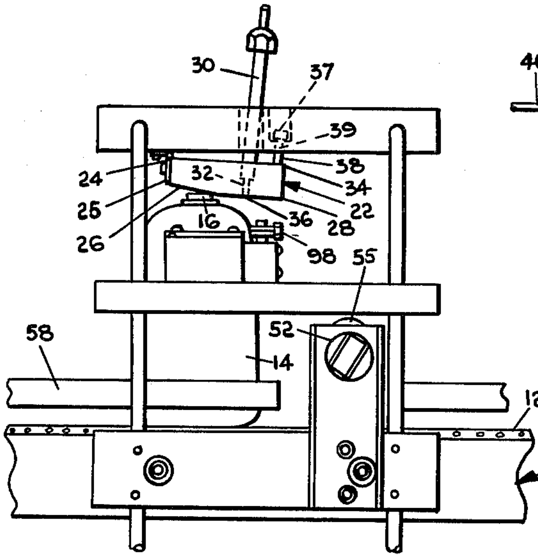
FIG. 2 is a fragmentary side elevational view of the nozzle and inspector stand as shown in FIG. 1.

Referring particularly to FIG. 2, the nozzle is pivotably mounted at an upper front edges 24 thereof. The nozzle has a bottom inclined surface 26 downwardly extending from the lower edge 25 to a bottom flat rear surface 28.

A conduit 30 passes through the upper portion 20 of the stand 18 and is sealed to an air passage 32 extending through the nozzle 22. The air passage 32 has an opening 36 through the rear flat surface 28. A threaded fastener 38 threadably engages an upper rear portion 34 of the nozzle 22. The fastener 38 is slidably mounted in aperture 39 limited by head 37. The limited movement of fastener 38 limits the downward pivotal movement of the nozzle 22.

Figure 4:
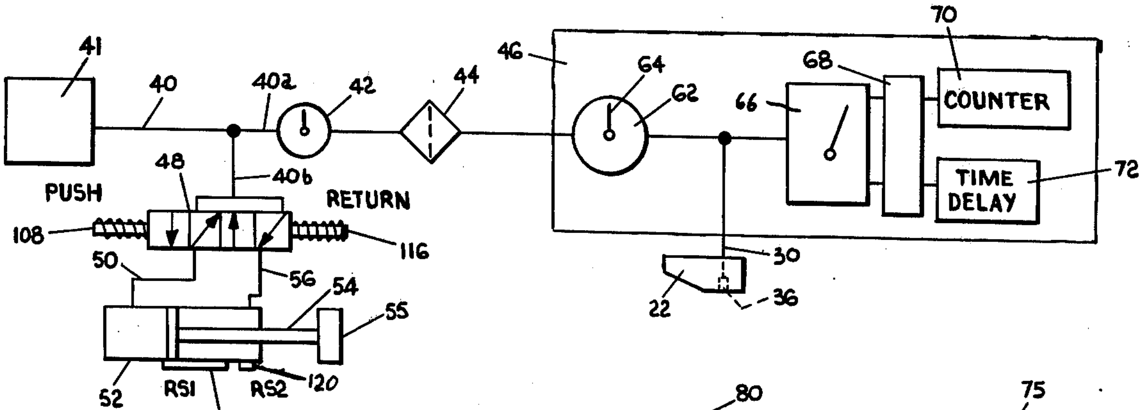
FIG. 4 is a schematic diagram of the operative parts of the pneumatic control circuit for the capped bottle inspection system.

Referring back to FIG. 1, a double acting cylinder 52 is mounted on the inspection stand down line along the conveyor from the nozzle 22. An extendible rod 54 is slidably connected to cylinder 52. A pushing block 55 is mounted on the extendible rod 54. As shown in FIG. 4, a return switch 114 is mounted on cylinder 52 between the two ends thereof. The return switch 114 is axially adjustable along the cylinder 52. A safety return switch 120 is mounted on cylinder 52 near the end where the rod 54 extends therefrom.

Also schematically shown in FIG. 4, hose 40 is connected to a high pressure air compressor 41. The air compressor 41 supplied a high pressure air stream, for example, 80 PSI gauge pressure. Hose 40 branches off into two branches 40(*a*) and 40(*b*).

Branch 40(*b*) is coupled to a valve 48 which is mounted on panel 46. Hose 50 leads from valve 48 and is connected to one end of a double acting cylinder 50. Pressurized air from hose 50 extends rod 54 from the double acting cylinder 52. Hose 56 leads from valve 48 to the other end of the double acting cylinder 52. Pressurized air from hose 56 retracts rod 54 into the double acting cylinder 52.

Branch 40(*a*) leads to an air regulator 42 which regulates the air stream to a moderate pressure, for example, 11 PSI. Branch 40(*a*) also includes an air purifier 44 and then passes into a box panel 46.

Figure 3:
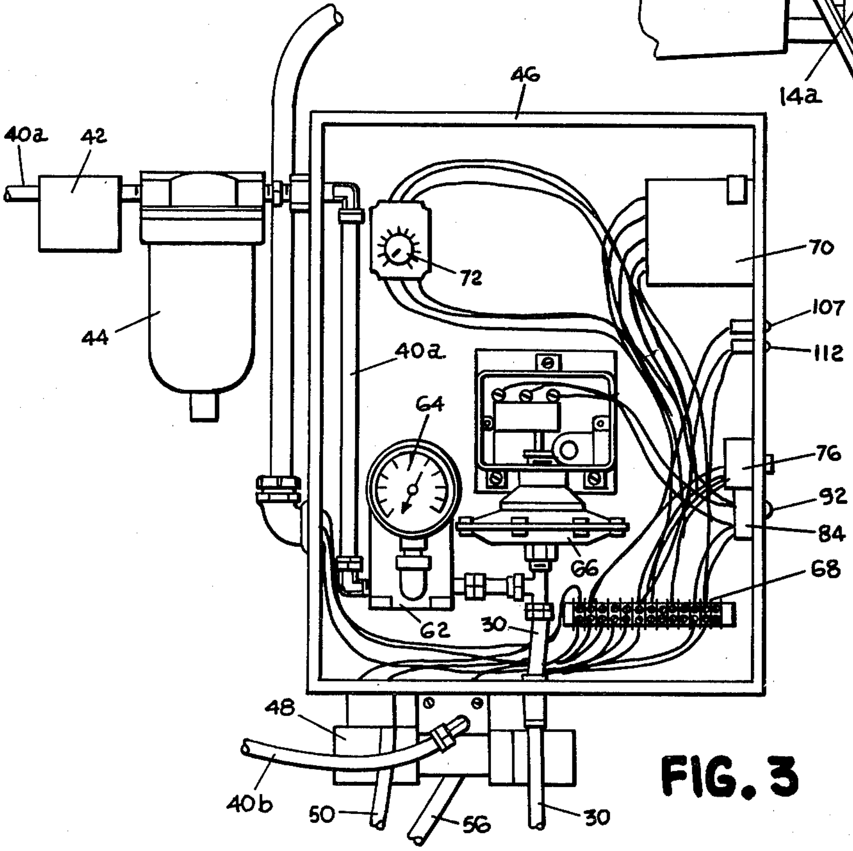
FIG. 3 is an enlarged, broken, front elevational view of the circuit panel for the capped bottle inspection system.

As shown in FIGS. 3 and 4, the box panel 46 has air line 40(*a*) extending through its side. An air regulator 62 is mounted within panel 46 and is operably connected to the input air line 40(*a*). The air regulator 62 has an air pressure gauge 64. The air conduit 30 is connect to the regulator 62 and extends out of the box panel 46 to the nozzle 22 A pressure sensitive diaphragm switch 66 is mounted securely within box panel 46 and is operably connected to the air conduit 30. The pressure sensitive diaphragm switch 66 is is set to be actuated by a predetermined pressure extending the pressure set by the regulator 62. For example, the air regulator 62 is set at a pressure of 3 PSI guage pressure and the pressure sensitive diaphragm switch 66 is set to be actuated at 4 PSI guage pressure.

As shown in FIGS. 1 and 2, guide rails 58, which extend along the conveyor 12, have an intermittent space 59 so that the extendible rod 54 can extend therethrough the space. A rejection holding tray 60 is mounted adjacent the conveyor opposite the cylinder 52, rod 54, and push block 55.

Electrically coupled to the pressure sensitive switch 66 is an electrical circuit 68 and solenoid operated valve 48. Electrical circuit 68 includes a counter device 70 and a time delay switching device 72.

Figure 5:
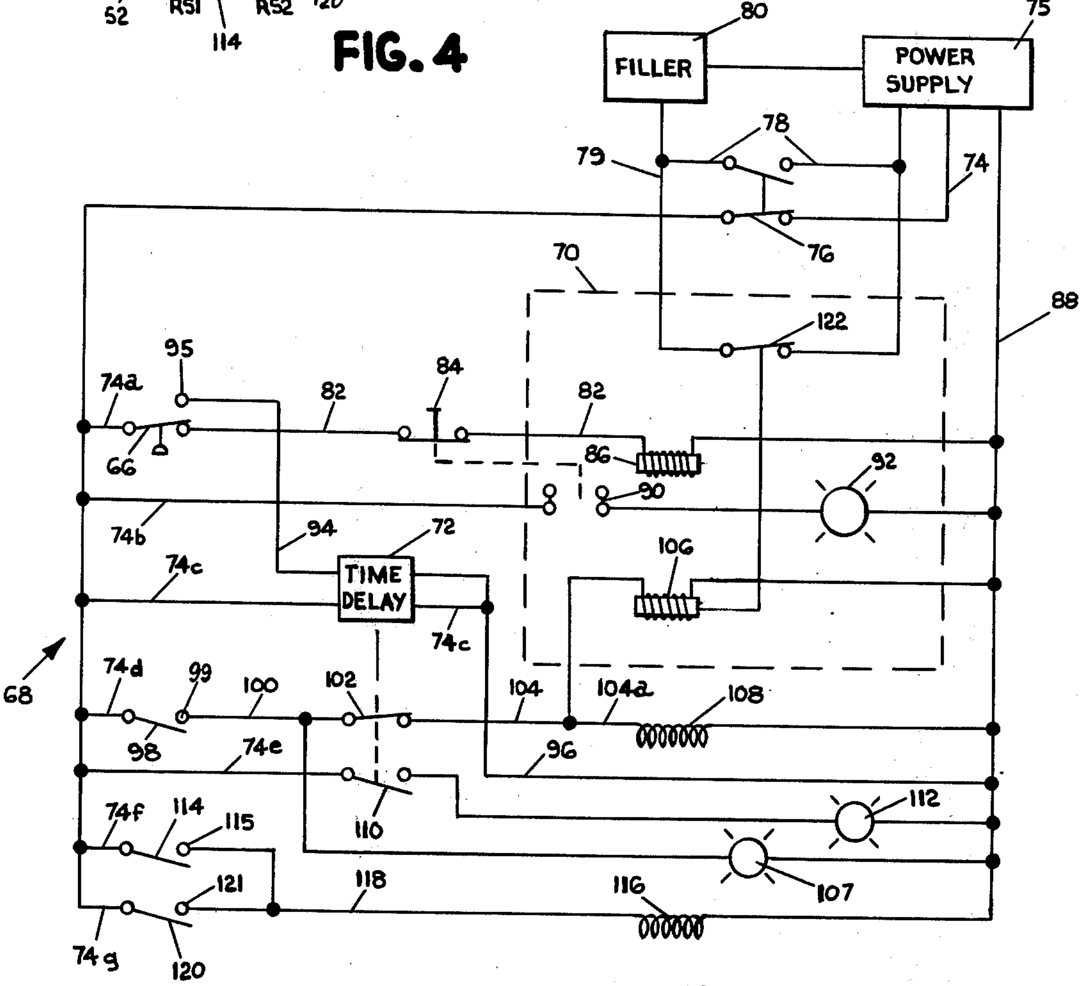
FIG. 5 is a schematic diagram of the electrical circuit for the capped bottle inspection system.

The electrical circuit 68 is schematically set forth in FIG. 5. Lead 74 is connected to a power supply. In line with lead 74 is the on-off switch 76. The on-off switch 76 is also connected to electrical circuit 79 which controls the filler 80. Electric circuit 79 is connected to count mechanism 70. Count mechanism 70 has normally closed switch 122 coupled in line with electrical circuit 79.

Branch 74(*a*) of lead 74 is connected to the pressure sensitive switch 66. Pressure sensitive switch 66 is normally closed with line 82. A manual reset button switch 84 is included in line 82 and is operably connected to the counting mechanism 70. The manual reset switch 84 is normally in the closed position with line 82. Line 82 is also connected to a reset solenoid 86 within counter 70. Line 82 is connected to a return lead 88 which is connected to the power supply 75.

Branch 72(*b*) is interrupted by a normally open set of contacts 90 within counter mechanism 70. The contacts 90 are closed when manual reset button switch 84 is actuated. A manual reset light indicator 92 is connected in line with the contacts 90 and is connected to return lead 88.

Branch 74(*c*) leads to the time delay switching mechanism 72 and supplies electrical power to the same. Also attached to the time delay switching mechanism 72 is line 94. Line 94 has an end contact 95 which is normally open with pressure switch 66. Pressure switch 66 contacts contact 95 when the former is actuated. Line 96 connects the time delay switching mechanism 72 to return lead 88.

Branch 74(*d*) is connected to a normally open limit switch 98. Line 100 connects the normally open contact 99 of the limit switch 98 to the normally closed time delay switch 102 which is opened when the time delay signal mechanism is actuated by an input signal through line 94. Connecting the normally closed time delay switch 102 to the count solenoid 106 in the counting mechanism 70 is line 104. The count solenoid 106 is also connected to the return lead 88.

Also connected to line 100 is a limit switch indicator 107. The indicator 107 is connected to return 88.

The operation of the counter mechanism 70 will now be described. Each time the count solenoid 106 is actuated, the count in the count mechanism is advanced by one. Each time the reset solenoid 86 is deactuated, the count goes back to zero. When the count reaches a preselected number, for example three, the normally closed switch 122 is opened.

Branch 104(*a*) is connected to a push solenoid 108 which operably controls valve 48 to open to allow rod 54 to extend from double acting cylinder as shown in FIGS. 1 and 2. The push solenoid 108 is connected to the return lead 88.

Branch 74(*e*) is connected to a normally open time delay control switch 110 which is closed when the time delay mechanism 72 is actuated by an input signal through line 94. The closure of switch 110 actuates the time delay actuation indicator 112. Indicator 112 is connected to return lead 88.

Branch 74(*f*) is connected to a normally open return switch 114. Return solenoid 116 is connected to the open contact 115 of line 118. A safety return switch 120 is connected to branch 74(*g*). Open contact 121 is also connected to line 118. Return solenoid 116 controls the valve 48 to retract rod 54 into the double acting cylinder 52. Return lead solenoid 116 is connected to the return lead 88.

The operation of the capped bottle inspection apparatus can be more clearly shown by referring to FIGS. 1, 4, and 5. As shown in FIG. 4, an input air stream passes through line 40 into branch 40(*a*) and through air regulator 42 which reduces the pressure to a moderate level. The air stream then passes through air purifier 44 which removes all moisture, and particulate direct matter from the air stream. The purified air passes through air regulator 62 wherein the pressure is limited to a predetermined lower pressure, for example, 3 PSI. The air regulator 62 has a slight delay in reacting to a high pressures to relieve excess pressure above the predetermined limit. The air pressure is indicated by air gauge 64. The air stream passes through hose 30 which is coupled to nozzle 22. The air stream is continuously passing through opening 36 in nozzle 33.

Conveyor 12, as shown in FIG. 1, continuously moves the bottles 14 under nozzle 22. When a properly capped bottle 14(*a*) passes underneath the nozzle 22, the cap 16 will close the opening 36. Air pressure will be built sufficiently to actuate pressure sensitive switch 66 before the bottle moves forward and disaligns cap 16 with opening 36.

Referring to FIG. 5, the pressure sensitive switch, when actuated, cuts power off to the reset solenoid 86. The deactuation of the reset solenoid 86 resets counting mechanism 70. Pressure sensitive switch 86, when actuated, also closes with contact 95 to allow an impulse signal to be sent through line 94 to the time delay switching mechanism 72. The time delay switching mechanism 72 moves switches 102 and 110. Switch 102 is opened and switch 110 is closed. The time delay actuation indicator 112 is actuated by the closure of switch 110. The time delay mechanism keeps the time delay switches 102 and 110 in their respective positions for a predetermined period of time after pressure switch 66 returns to its normal position. The predetermined amount of time for illustrative purposes can be one-half second. Light 112 is lit to indicate the bottle is properly capped.

During the one-half second, the bottle continues down the conveyor, pushes rod 39 which closes the limit switch 98. Indicator 107 lights up to indicate that the limit switch is closed. Since the time delay switch 102 is open, neither the push solenoid 108 nor the count solenoid 106 are actuated. The bottle 14*a* then continue down the conveyor 12 past the push block 55 and past rod 39 which pivots back to its first position and reopens limit switch 98.

Figure 6:
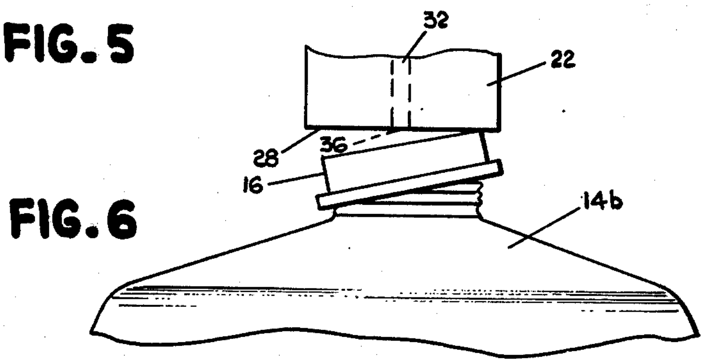
FIG. 6 is a fragmentary enlarged side elevational view of the nozzle abutting an improperly capped bottle.

If an improperly capped bottle or an uncapped bottle 14*b* passes under nozzle 22, no back pressure buildup occurs in passage 32 and pressure sensitive diaphragm switch 66 is not actuated. As shown in FIG. 6, a tilted or disaligned or otherwise defective cap 16 will not close the opening 36.

Hence, the time delay switching mechanism is not actuated and switches 102 and 110 remain in their respective closed and opened positions. The defectively capped bottle 14*b* will then move beyond nozzle 22 and press against limit switch rod 39 and pivot it to close the limit switch 98. When limit switch 98 is closed, both the count solenoid 106 and push solenoid 108 are actuated. The push solenoid 108, as shown in FIG. 4, pushes valve 48 to allow air to rush into the cylinder 52 to extend the rod 54. The pushing block 55 abuts the bottle 146 and pushes it off the conveyor onto rejection holding tray 60 as shown in FIG. 1. As the bottle is pushed off the conveyor, the pivotably mounted limit switch rod 39 will return to its spring biased position and reopen limit switch 98 which deacutates the push solenoid 108 and count solenoid 106.

Thereafter, the extending rod passes return switch 114 and closes the same to actuate the return solenoid 116. The return solenoid moves valve 48 to a position to retract the push rod 54.

If, per chance, the push rod 54 passes return switch 114 without actuating the same, the push rod 54 will become fully extended and engage the safety return switch 120 which will also actuate the return solenoid 116 so that the push rod 54 is retracted.

The time delay switching mechanism then deactuates and returns switches 102 and 110 to their normally closed and open positions respectively. The inspection apparatus is then ready to inspect the next bottle 14.

The count mechanism 70 is set at a predermined number such that as a predetermined number of defectively capped bottles 14*b* are sequentially inspected, the counting mechanism will open switch 122 and shut down the filler 80. An operator then may inspect and find the source of the trouble and afterwards manually reset the inspection system by pressing switch 84 which resets the counter and recloses switch 122.

If, per chance, the inspection system breaks down, the on-off switch 76 can be turned to the off position which simultaneously closes contact 78 so that the filler 80 can run independently of the inspection system.

In this fashion, a cap bottle inspection apparatus 10 can inspect and sort defectively capped bottles 14(*b*) from properly capped bottle 14(*a*).

Reasonable variation and modifications may be made to the above described embodiments without departing from the spirit and scope of the invention as defined in the appended claims.

The embodiments of the invention in which an exclusive property or privilege is claimed are defined as follows:

1. An apparatus for inspecting capped bottles, the apparatus comprising:
   - a nozzle shaped to seal against a cap of a properly capped bottle, the nozzle further having a passage therethrough;
   - means for supplying gas at a first pressure to the nozzle passage;
   - means for measuring the rate at which pressure builds up within the passage to a level above the first pressure when the nozzle is in sealing engagement with the bottle cap;
   - means coupled to the measuring means for indicating whether the rate at which the pressure builds up within the nozzle passage is as great as or below a predetermined rate;
   - whereby an improperly positioned cap as well as uncapped bottles can be detected with the inspecting apparatus.

2. An apparatus for inspecting capped bottles according to claim 1 wherein:
   - the gas supply means includes a conduit communicating with the nozzle passage;

the rate measuring means comprises:

a pressure sensitive switch in the conduit to detect the presence of a second predetermined pressure in the gas supply means conduit, the second predetermined pressure being above the first pressure of the gas supply means; and means for passing the bottle by the nozzle such that the nozzle is in sealing engagement with a properly mounted bottle cap for a predetermined length of time.

3. An apparatus for inspecting capped bottles according to claim 2 wherein the rate indicating means comprising a circuit including the pressure sensitive switch, the switch effecting current flow through the circuit when the second predetermined pressure is detected by the pressure sensitive switch; and further comprising:

an ejector spaced from the nozzle for ejecting bottles from a given path of travel;

means for moving the bottle from the nozzle to the ejector;

means electrically coupled in the circuit for actuating the ejector responsive to the detection of a predetermined pressure by the pressure sensitive switch; and delay means in the circuit for delaying actuation of the ejector until the bottle has moved from the nozzle to the ejector.

4. An apparatus for inspecting capped bottles according to claim 3 wherein the pressure supply means comprises a regulator which maintains the pressure in the conduit at the first pressure, the regulator further having delay means for delaying the effective operation of the regulator to reduce the pressure in the conduit to the first pressure for a predetermined length of time such that the pressure in the line is allowed to build up in a controlled manner within the predetermined time when the nozzle is in sealing relationship with the bottle cap.

5. An apparatus for inspecting capped bottles according to claim 4 wherein the nozzle is shaped to provide a sealing surface with a cap having a substantially flat upper surface and being properly positioned on the bottle.

6. An apparatus for inspecting capped bottles according to claim 2 wherein the pressure supply means comprises a regulator which maintains the pressure in the conduit at the predetermined first pressure and at the given flow rate, the regulator having delay means for delaying the effective operation of the regulator to reduce the pressure in the conduit to the first pressure for the predetermined length of time such that the pressure in the line is allowed to build up in the controlled manner within the predetermined time when the nozzle is in sealing relationship with the bottle cap.

7. An apparatus for inspecting capped bottles according to claim 6 and further comprising means coupled to the indicating means for sorting the bottles depending on whether the rate at which the pressure builds up in the nozzle air pressure is as great as or below the predetermined rate.

8. An apparatus for inspecting capped bottles according to claim 1 and further comprising means coupled to the indicating means for sorting the bottles depending on whether the rate at which the pressure builds up in the bottle is as great as or below the predetermined rate.

9. A cap inspecting apparatus as defined in claim 1 and further comprising means for automatically stopping a bottle filler which fills the bottles that are inspected if the number of defectively capped bottles exceeds the predetermined number.

10. In a bottle inspecting apparatus having a nozzle which can be positioned in a sealed engagement with a bottle cap, the cap having a flat upper portion and a cylindrical portion which engages a corresponding cylindrical portion of a bottle neck, means for supplying a gas pressure through an air passage in a nozzle, means for measuring the change in the gas pressure within the air passage while sealed by a cap, means coupled to the measuring means for indicating whether the change of pressure within the air passage is greater or less than the predetermined rate whereby the defect and deformities in the cap can be detected, means for sorting the caps into a defective group and conforming group depending on the sensing of the indicating means; the improvement which comprises:

the nozzle having a rearward flat bottom surface with the air passage extending therethrough, and a forward inclined bottom surface inclining upwardly from the rear bottom surface;

the front of the nozzle pivotably mounted about a horizontal axis; and means to pivotably bias the nozzle downwardly to abut a tested cap such that the capped bottle moving relative to the nozzle passes under the inclined portion, abuts the inclined portion to slightly raise the nozzle, and passes under the bottom rear surface such that only if the bottle is properly capped, the cap seals the air passage.

11. A method of inspecting capped bottles for deformities, and other imperfections, the method comprising:

aligning the cap of the capped bottle under an opening of a passage such that the cap if properly positioned on the bottle seals the opening;

injecting gas at a predetermined rate and at a first predetermined pressure into the passage adjacent the cap;

measuring the rate at which the pressure builds up in the passage to a pressure in excess of the first predetermined pressure; and sorting the bottles according to whether the rate of pressure buildup in the passage is as great as or falls below a predetermined rate.

* * * * *